United States Patent
Gonsalves et al.

(10) Patent No.: US 9,420,457 B2
(45) Date of Patent: Aug. 16, 2016

(54) MULTIPLE-PERSONA ON MOBILE DEVICES

(71) Applicant: AetherPal Inc., South Plainfield, NJ (US)

(72) Inventors: Deepak Gonsalves, Bridgewater, NJ (US); Ranjithkumar Palanichamy, Edison, NJ (US); Subramanyam Ayyalasomayajula, Kendall Park, NJ (US); Pooja Chengappa, Edison, NJ (US); Ramesh Parmar, Scotch Plains, NJ (US)

(73) Assignee: AetherPal Inc., South Plainfield, NJ (US)

( * ) Notice: Subject to any disclaimer, the term of this patent is extended or adjusted under 35 U.S.C. 154(b) by 243 days.

(21) Appl. No.: 14/182,514

(22) Filed: Feb. 18, 2014

(65) Prior Publication Data

US 2014/0235203 A1 Aug. 21, 2014

Related U.S. Application Data

(60) Provisional application No. 61/766,007, filed on Feb. 18, 2013.

(51) Int. Cl.
| | |
|---|---|
| *H04W 12/04* | (2009.01) |
| *H04L 9/00* | (2006.01) |
| *H04W 12/06* | (2009.01) |
| *H04L 29/06* | (2006.01) |
| *H04L 9/32* | (2006.01) |
| *H04W 88/02* | (2009.01) |

(52) U.S. Cl.
CPC .............. *H04W 12/04* (2013.01); *H04L 9/007* (2013.01); *H04L 63/0823* (2013.01); *H04W 12/06* (2013.01); *H04L 9/3265* (2013.01); *H04L 2209/38* (2013.01); *H04W 88/02* (2013.01)

(58) Field of Classification Search
CPC ..... H04W 12/04; H04W 12/06; H04W 88/02; H04L 9/007; H04L 9/3265; H04L 63/0823; H04L 2209/38
USPC .......................... 455/410–411, 414.1, 435.1; 713/155–158
See application file for complete search history.

(56) References Cited

U.S. PATENT DOCUMENTS

| | | | | |
|---|---|---|---|---|
| 2006/0047949 | A1* | 3/2006 | Brown | H04L 9/3265 713/156 |
| 2006/0209773 | A1* | 9/2006 | Hundal | H04L 63/0428 370/338 |
| 2010/0037296 | A1* | 2/2010 | Silverstone | G06F 21/445 726/3 |
| 2011/0252227 | A1 | 10/2011 | Strong et al. | |
| 2011/0252240 | A1* | 10/2011 | Freedman | H04L 63/02 713/169 |
| 2013/0013923 | A1* | 1/2013 | Thomas | H04W 12/06 713/168 |

FOREIGN PATENT DOCUMENTS

| | | | | |
|---|---|---|---|---|
| CA | EP 2456158 A1 * | 5/2012 | | G06F 21/33 |
| EP | 1653655 A1 | 5/2006 | | |
| EP | 2456158 A1 | 5/2012 | | |

* cited by examiner

*Primary Examiner* — Michael Mapa
(74) *Attorney, Agent, or Firm* — Volpe and Koenig, P.C.

(57) ABSTRACT

Disclosed is a system and method of allowing multiple customer support organizations to establish virtual mobile management sessions with a mobile device using a multi-persona client on the mobile device that does not have to reconfigured for each of the multiple customer support organizations.

31 Claims, 9 Drawing Sheets

MULTIPLE-PERSONA ON MOBILE DEVICES

CROSS REFERENCE TO RELATED APPLICATIONS

This application claims the benefit of U.S. provisional application No. 61/766,007, filed Feb. 18, 2013, the contents of which are hereby incorporated by reference herein.

TECHNICAL FIELD

This application is related to mobile wireless communication devices and, in particular, to mobile wireless communication devices that are multi-persona capable during a Virtual Mobile Management (VMM).

BACKGROUND

When a customer calls in with an issue for smart mobile devices, remote support technicians use various cumbersome internal and external online resources in order to narrow down and troubleshoot the mobile device user's or subscriber's issue. This exercise usually is very time consuming, increases the support call handling time and may frequently result in customer dissatisfaction. Further, unsatisfactory customer support usually results in repeat calls for the same issue thus increasing the overall cost of customer support.

Virtual mobile management (VMM) reduces this effort by allowing the technicians to view, operate and control the device held by the mobile device user or subscriber remotely over the air. However, the VMM solution is configured and implemented allowing only one entity to perform a VMM session with the mobile device using the single client. In particular, once the mobile device is configured for remote support from one entity, the mobile device would need to be reconfigured for support from another entity. In some instances, enrollment with a different entity is not possible due to policy and security reasons. Moreover, a new enrollment clears out the present configuration.

What is lacking in the art is a secure method of allowing remote support technicians within the Carrier organizations, Enterprise organizations, Original Equipment Manufacturer (OEM) organizations, and the like to be able to avail of VMM services into the same device via a single client while maintaining unique security associations with each controlling entity.

SUMMARY OF THE INVENTION

Described herein is a method and system that allows multiple customer support organizations to perform a virtual mobile management (VMM) session into a mobile device using the same client, where the VMM reduces the support call handling time by allowing the remote support technician to view, operate and control the mobile device held by the subscriber, mobile device user or customer. The method and system allows a VMM session between a mobile device and multiple support organizations from the same client without requiring re-configuration or re-install of the device client. Furthermore, all VMM sessions are done in a secure manner, thereby, protecting subscriber privacy and data while inheriting the controlling entity's persona.

Remote support technicians with in Carrier organizations, Enterprise organizations, Original Equipment Manufacturer (OEM) organizations, and the like will be able to remotely control and provide assistance to subscribers, mobile device users and customers of mobile devices via a single client that is capable of securely enrolling and communicating with multiple servers. Various attributes during the VMM session would change and vary based on the type or nature of the server, (i.e. Carrier, OEM, Enterprise and the like), due to up front configuration of these definitions on the servers.

The system provides and presents a seamless end user experience regardless of where the remote care is being provided.

The method and system supports and handles the mobile device lifecycle across all organizations.

The method and system maintains an unique security association with each controlling entity, (i.e. Carrier, OEM, Enterprise and the like), and assumes its persona during a remote session.

The method and system simplifies the management of the remote control client and ensures that the end user gets consistent support experience.

The method and system supports Bring Your Own Device (BYOD) environments, where there are multiple behaviors on the same mobile device, (i.e. for work and for personal use). Therefore, there would be a need to have remote care for work related activities by an enterprise admin and remote care from a carrier for personal activities.

Objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

A more detailed understanding may be had from the following description taken in conjunction with the accompanying drawings wherein are set forth, by way of illustration and example, certain embodiments. The drawings constitute a part of this specification and include embodiments and illustrate various objects and features thereof.

DETAILED DESCRIPTION

Figure 1:
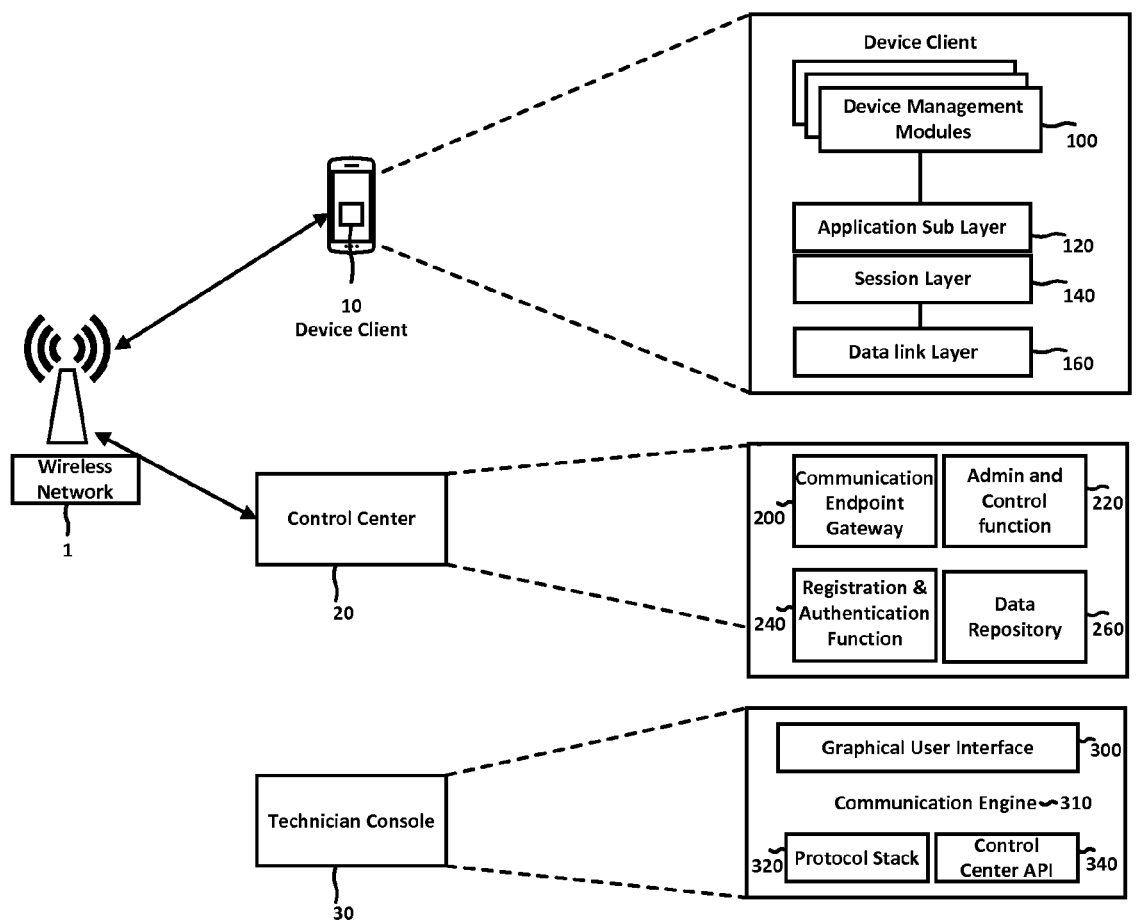
FIG. 1 shows an example system and architecture of a virtual mobile management system or a remote management system in accordance with some embodiments.

It is to be understood that the figures and descriptions of embodiments have been simplified to illustrate elements that are relevant for a clear understanding, while eliminating, for the purpose of clarity, many other elements. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein.

The system and method benefits the end-users, subscribers, mobile devices users and the like, (collectively "mobile device users"), of the mobile devices in that they can gain seamless support from multiple organizations without having to make any changes on the mobile device. The multiple organizations may be Carrier organizations, Enterprise organizations, Original Equipment Manufacturer (OEM) organizations and the like. Due to the increase in Bring Your Own Devices (BYOD) programs at Enterprises, the Enterprise admins would be able to set policies and profiles that would enable them to only look at work related activities.

For the support organizations, the benefit stems from the fact that if there is an issue that Carriers are unable to fix and would need to be referred to an OEM, the OEM support would then be able to perform a VMM session on the mobile device to identify and fix the issue without needing to install additional applications on the mobile device. This way, the same mobile device would be able to be accessed by multiple support organizations in order to troubleshoot the issue.

The system and method allows the device client to negotiate and maintain unique security associations with each server (i.e. Carrier, OEM, Enterprise and the like), during registration. During each VMM session, the client identifies the persona associated with the server and enables the requested service. During a VMM session, the client applies the pre-negotiated policies and profiles for the given persona. If the client is re-installed on the device, the client implements a best effort mechanism to restore the personas.

The following are some of the use cases where a multi-persona device client might be used.

An example use case is a Client Pre-Loaded by an OEM for operator or network service provider requirement that the OEM provide remote management or VMM support. The client is already pre-loaded onto the mobile device by the OEM based on a network service provider requirement to support network service provider's mobile device users. The remote support to be provided by OEM.

Another example use case is a Client over the air (OTA) downloaded by a network service provider so that the OEM provides remote management or VMM support. In this use case, the Client was downloaded onto the mobile device over the air or side loaded at post launch in a previous network service provider VMM session request. The remote support to be provided by OEM.

Another example use case is a Client Pre-Loaded by OEM so that the network service provider can provide VMM support. The Client was pre-loaded onto the mobile device by the OEM based on a direct agreement with the OEM. The remote support to be provided by the network service provider.

Another example use case is a Client OTA Downloaded by OEM so that the network service provider provides VMM support. In this case, the Client was downloaded onto the mobile device over the air or side loaded at post launch in a previous OEM VMM session. The remote support to be provided by the network service provider.

Another example use case is a Client Pre-Loaded by Operator/network service provider so that an Enterprise may provide VMM support. The client is already pre-loaded onto the mobile device by the OEM based on a network service provider requirement to support network service provider's mobile device users. The remote management or VMM support to be provided by an enterprise.

Another example use case is a Client Previously Post Launch Installed so that an Enterprise may provide VMM support. The Client was already installed onto the mobile device by the OEM at product launch, or installed over the air or side loaded at post launch in a previous network service provider or OEM VMM session. The remote or VMM support to be provided by an enterprise.

Another example use case is a Client Pre-Loaded for remote or VMM support by an independent 3rd party organization, friends and family. In this case, the client was installed by the OEM at product launch or was side loaded using an over-the-air mechanism. The remote support to be provided by an independent 3rd party organization, friend or family member.

The above example use cases are illustrative and other uses cases may be applicable or appropriate that are within the scope of the invention.

FIG. 1 is an example overall architecture of a VMM system which comprises at least a device client residing on a device (collectively device client/client 10), a control center system 20 and a technician console 30. The device 10 communicates with the control center 20 through a wireless network 1. For purposes of readability, block numbers starting with: 1xx relate to the device 10 and it components; 2xx relate to the control center system 20 and its components; and 3xx relate to the technician console 30 and its components.

The control center system 20 is responsible for data management, device management, web services, analytics, security management, administrative services and device connectivity. The components of the control center system 20 include a communication end point gateway (CEG) 200, an admin and control function or entity 220, a registration and authentication function module or entity 240 and a data repository 260. The gateways, modules and/or entities are implemented as or in processors, servers and/or any computing device or system.

The CEG 200 manages the device connections within the system. In particular, the CEG 200 provides communication endpoints between the admin and control function module or entity 220 and the device 10, allows for multiple requests to be serviced within one session from multiple consoles, provides a consistent manner of device connection and tool service in a system with heterogeneous devices running different operating systems, provides load balancing across multiple connection handlers, (as described herein below), on each CEG 200 in order to minimize single point of failure.

Figure 2:
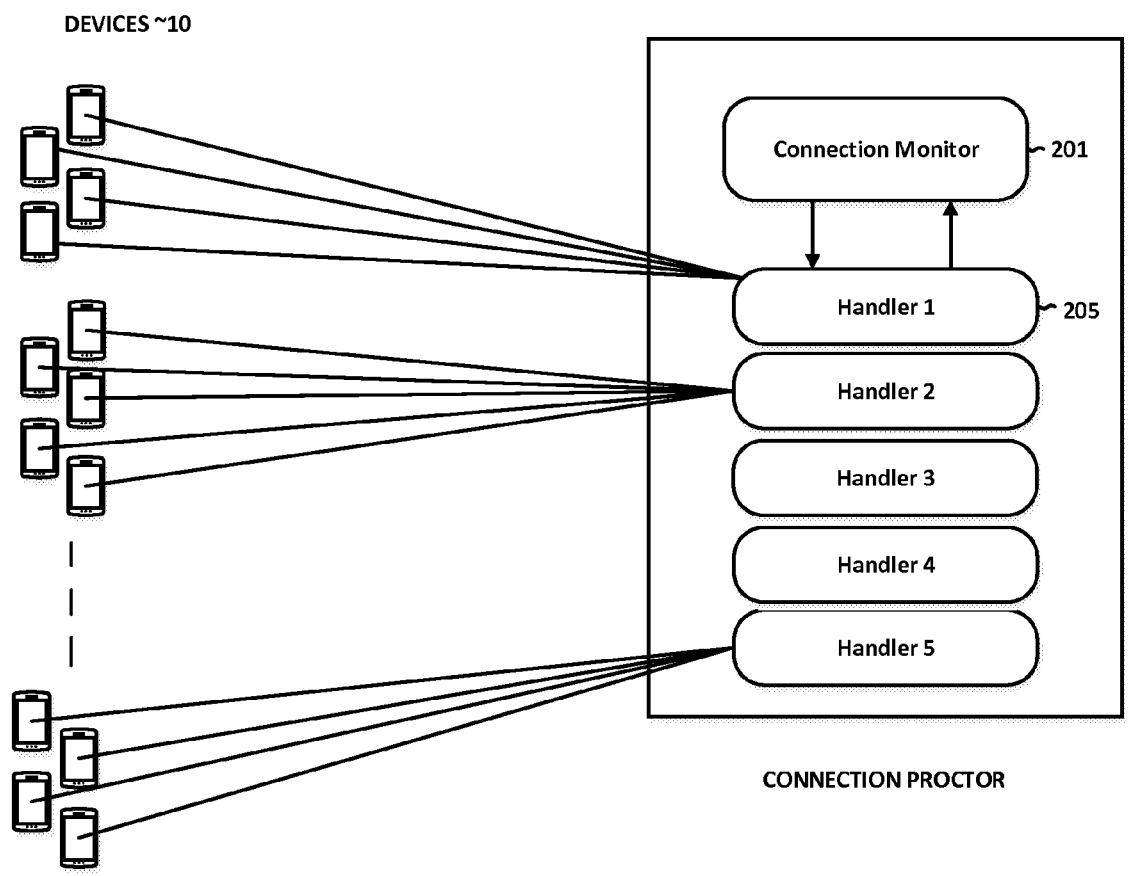
FIG. 2 shows an example of a connection end point gateway in accordance with some embodiments.

FIG. 2 shows an example CEG 200 which includes at least a connection monitor 201 and connection handlers 205. The connection monitor 201 creates and manages connection handlers 205, creates session IDs for new connection requests and monitors all the scheduled and existing sessions with devices 10. By default, a connection handler 205 is setup for every CEG 200, where the number of connection handlers 205 is configurable. All the sessions are load distributed across the connection handlers 205. Each connection handler 205 handles multiple device sessions.

Referring back to FIG. 1, the admin and control function or entity 220 administers and manages all types of communication between the control center 20 and the client devices 10. For example, the admin and control function or entity 220 may include an administrative service that acts as the central administration entity of the system. Through this service, system administrators perform administration, management and instrumentation of all the servers within the system, create and maintain multiple tenants, assign tenant administrator roles, and other like functions. In another example, the admin and control function or entity 220 may have a management service which provides the operational end point to the system and performs load distribution among the CEGs 200, management of device registration, administration of devices and session queuing. A management entity may be included which is responsible for providing the management service with in-memory data storage for key operational data user/group/zone structures, and the like. In another example, the admin and control function or entity 220 may have a service coordinator which is responsible for coordinating the communication between various elements within the system. It provides the database interface to the registration and authentication function 240. All services register themselves with the service coordinator. The service coordinator is responsible for service discovery.

The data repository 260 stores all the information about the devices 10, server configuration, tasks and status settings. The data repository 260 is pivotal to configure and update managed devices and server components. It is also responsible for maintaining the device authentication information. The data repository 260 may comprise three database (DB) elements: an admin DB, operations (Ops) DB, and a reports DB. The admin DB maintains all the system configurations, tenant configuration and management information, system administration and server instrumentation data. This database is accessed by the administrative service. The Ops DB maintains data that is required for the operations of the system such as device enrollment, device information, user details and the like. This database is accessed by the management service and the service coordinator. The reports DB contain historical data of device enrollment, session, audit, report views, and the like.

The registration and authentication function 240 provides a single point of entry for all devices for enrollment and authentication services during a session. In an example, the registration and authentication function 240 comprises a registration service. In another example, the registration and authentication function 240 includes an enrollment service, which is responsible for enrolling registered devices with the system. In another example, the registration and authentication function 240 includes a software update module which manages the various client packages in the system. Devices connect to the software update module to request client updates. If an update is available, the software update module will provide the appropriate client download link. In another example, the registration and authentication function 240 includes an anchor admin which provides the administration component.

The device client 10 includes at least device management modules 100, application sub-layer 120, session layer 140, and data link layer 160. These modules are explained in detail in FIG. 3.

Figure 3:
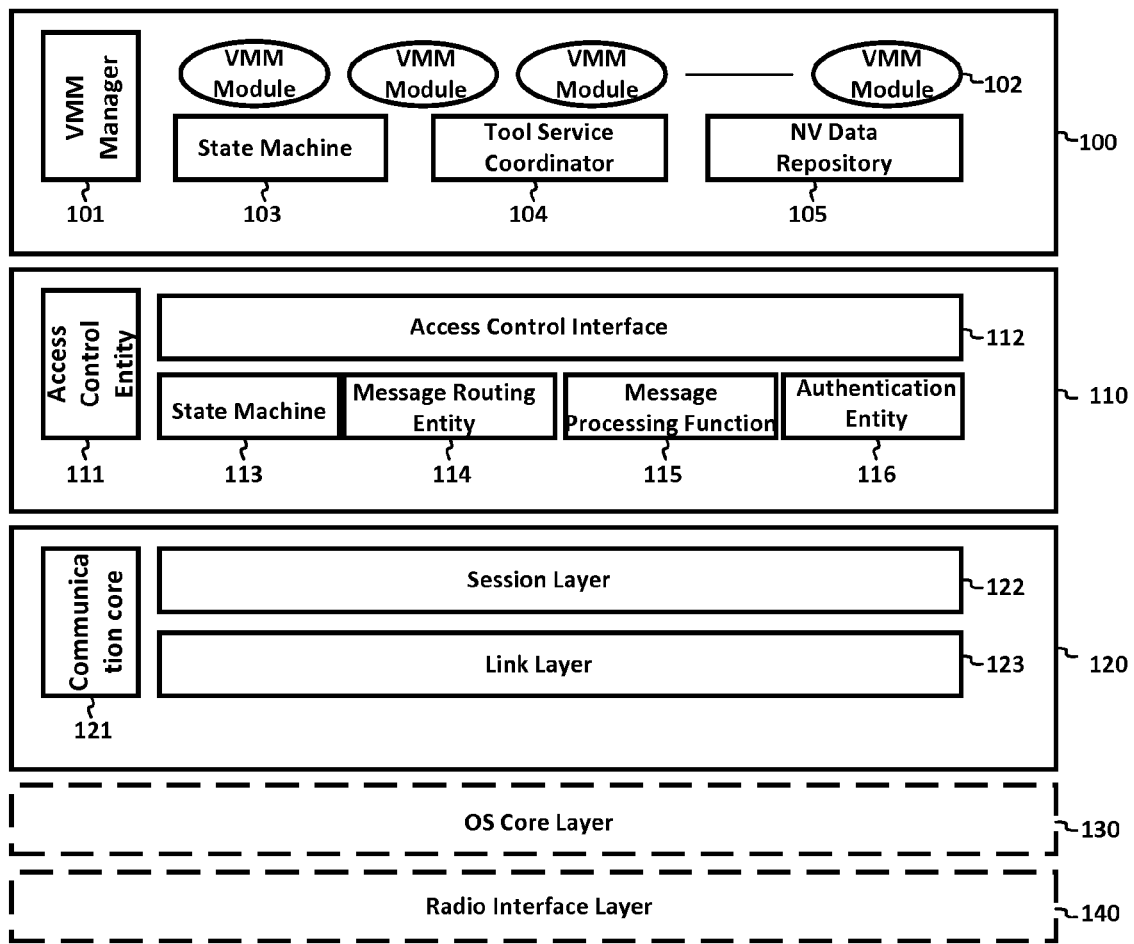
FIG. 3 shows an example device client architecture in accordance with some embodiments.

Referring to FIG. 3, the device client module includes a virtual mobile management (VMM) manager 100, an access control entity 110 and communication core layer 120.

The VMM manager 101 includes VMM modules 102, a state machine 103, a tool service coordinator 104 and a non-volatile data repository 105. The VMM modules 102 provide a multitude of tool services. The tool services are grouped together to exhibit common functionality such as remote control, remote navigational guidance and the like. Each tool service maintains an instance of a state machine 103, which defines a set of shared states that the tool service on the device application shares with the control center 20. The tool service coordinator 104 maintains a collection of active tool service instances that are currently being serviced by the entire VMM application. The tool service coordinator 104 maintains the lifetime of all tool services, and is responsible in creating and destroying tool services. The non-volatile data repository 105 stores authentication and authorization specific data that is shared between the VMM application and the control center 20. The non-volatile data repository 105 also serves the purpose of maintaining tool service configuration as well as VMM configuration data.

The access control entity 111 provides a set of functions to the tool services to communicate with the control center 20. The access control entity 111 provides encapsulation of messages before forwarding it to the communication core layer 120. It invokes an instance of the communication core layer 120 and provides a state machine 113 that defines the state of the VMM application.

The access control entity 111 interacts with an access control interface (ACI) 112, which provides a set of standard Application Programmer Interfaces (API) to the tool services. These APIs provide a consistent communication platform to facilitate both synchronous as well as asynchronous communication. The state machine 113 identifies the overall state of the VMM application. State transitions within the state machine 113 triggers events that are handled by the VMM layer 100. The states are open and close and traffic flows through the ACI 112 only in the open state.

An authentication entity 116 is responsible for ensuring that the device 10 receives a connection and processes requests from the control center 20 with which it is enrolled. The authentication entity 116 ensures data integrity, security and authentication. A message routing entity 114 is responsible for routing all signal messages destined to tool services to the respective event handlers. A message processing function 115 is a signal message pre-processor and receives signal messages from the session layer 122 destined towards tool services. A message processing entity 115 de-frames these messages prior to forwarding it to the message routing entity 114, which applies the routing rules. Messages that are destined to the control center 20 from tool services are encapsulated in the message processing function 115.

The communication core layer 120 setups and maintains a dedicated communication channel with the control center 20. The communication core layer 120 provides the necessary framework to transport messages between the upper layers 100 and 110 and the control center 20. The communication core layer 121 provides message encapsulation, framing, fragmentation and packet re-construction of tool service messages.

The link layer 123 is responsible for establishing and maintaining a dedicated communication channel between the client and the CEG 200. The Link Layer 123 encapsulates all messages within its frame prior to forwarding it to the network. Packets that are received by the Link Layer 123 from the network are re-constructed and de-framed prior to forwarding it to the upper layer. This layer checks for message integrity.

The operating system (OS) Core layer 130 provides system APIs that are necessary to communicate with the underlying operating system. These APIs are dependent on the underlying operating system.

The Radio Interface layer 140 contains the wireless radio protocol and services necessary to communicate over a wireless signal.

The technician console 30 comprises a Graphical User Interface 300, a communication engine 310, a protocol stack 320 and a control center API 340. The remote support technician can initiate remote connection to the device, view tutorials, related videos and perform contextual searches to troubleshoot issues on the connected device from the technician console 30.

Described herein are methods for enabling multiple persona client architecture. In order to have secure communications between the device client 10 and the VMM systems, public key cryptography is used. The cryptographic algorithm requires two separate keys, one of which is private and one of which is public. Although different, the two parts of this key pair are mathematically linked. The public key is used to encrypt plaintext or to verify a digital signature; whereas the private key is used to decrypt cipher-text or to create a digital signature.

Public-key algorithms are based on mathematical problems. It is computationally easy for a user to generate their own public and private key-pair and to use them for encryption and decryption. The strength lies in the fact that it is computationally infeasible for a properly generated private key to be determined from its corresponding public key. Thus the public key may be published without compromising security, whereas the private key must not be revealed to anyone not authorized to read messages or perform digital signatures.

Message authentication involves processing a message with a private key to produce a digital signature. Thereafter anyone can verify this signature by processing the signature value with the signer's corresponding public key and comparing that result with the message.

A digital certificate is required in order to avoid the case that a malicious party which happens to be on the path to the target server pretends to be the target. The digital certificate certifies the ownership of a public key by the named subject of the certificate. This allows other relying parties to rely upon signatures or assertions made by the private key that corresponds to the public key that is certified. A Certification authority (CA), is an entity that issues digital certificates that contain a public key and the identity of the owner. The certificate is also a confirmation or validation by the CA that the public key contained in the certificate belongs to the person, organization, server or other entity noted in the certificate.

A certificate authority can issue multiple certificates in the form of a tree structure. A root certificate is the top-most certificate of the tree, the private key of which is used to "sign" other certificates. All certificates immediately below the root certificate are known as intermediate certificates and inherit the trustworthiness of the root certificate.

Each device client uses the CA certificate to verify the CA signature on the server certificate, as part of the checks before establishing a secure connection. The device client includes a set of trusted CA certificates built into it. The device client also has a Certificate Revocation List [CRL] built into it. The CRL is a list of certificates that have been revoked and therefore entities presenting those revoked certificates should no longer be trusted. A CRL is generated and published periodically.

In case of a multi-persona, a single device client needs to communicate securely with multiple remote servers, such as a Mobile Operator/network service provider Customer Care system; OEM Customer Care system; Enterprise Help Desk; Third Party Support Center; and Individual subscriber systems to support their own device.

Described herein is a method and system to communicate securely with multiple remote servers that targets vendor based organizations which will include network service providers, OEMs and the like, where each vendor will be identified by a Public Key Organization Identifier (PKOID). In another embodiment, the method and system targets vendors with associated enterprise organizations, where each vendor will be identified by a PKOID and each enterprise is identified by the combination of a PKOID/Public Key Organization Index (PKOI). The enterprise server has all the intermediate CAs to be supported.

In all the use cases and embodiments described herein above, one server will be identified as the home persona server. The multi-persona client will have the certificates of the home server embedded into its software. This allows the multi-persona client to start communication with the home server and auto-enroll itself to the home server. In cases where auto enrollment is not necessary, the client enrolls with the home server only when a request is made from the home server. The client uses it's built in root and intermediate certificates to authenticate the home server. As a part of the enrollment process, the home server transfers a policy to the device client. Each policy contains, but is not limited to, multi-persona profile, audit profile, client behavior profile, security policies, bootstrap behavior, access control policy, service control policy, and the like. These profiles determine if the device client is allowed to enroll itself with other servers. In essence this policy determines if the device client is multi-persona capable. Once multi-persona feature has been enabled on the client, it can be only disabled by the home server. The device client gets an updated policy from the home server whenever a new enrollment or connection starts from other servers. The updated policy response is digitally signed by the home server. The client validates the signature with Home persona certificate and updates the policy accordingly. If validation fails, the last valid policy is enforced. An audit enabled flag is used for tracking of enterprise server connections by the home server. Whenever the device client is connected with an enterprise server, the client sends back a service notification to the home server with information related to the identity of the enterprise server.

Figure 4:
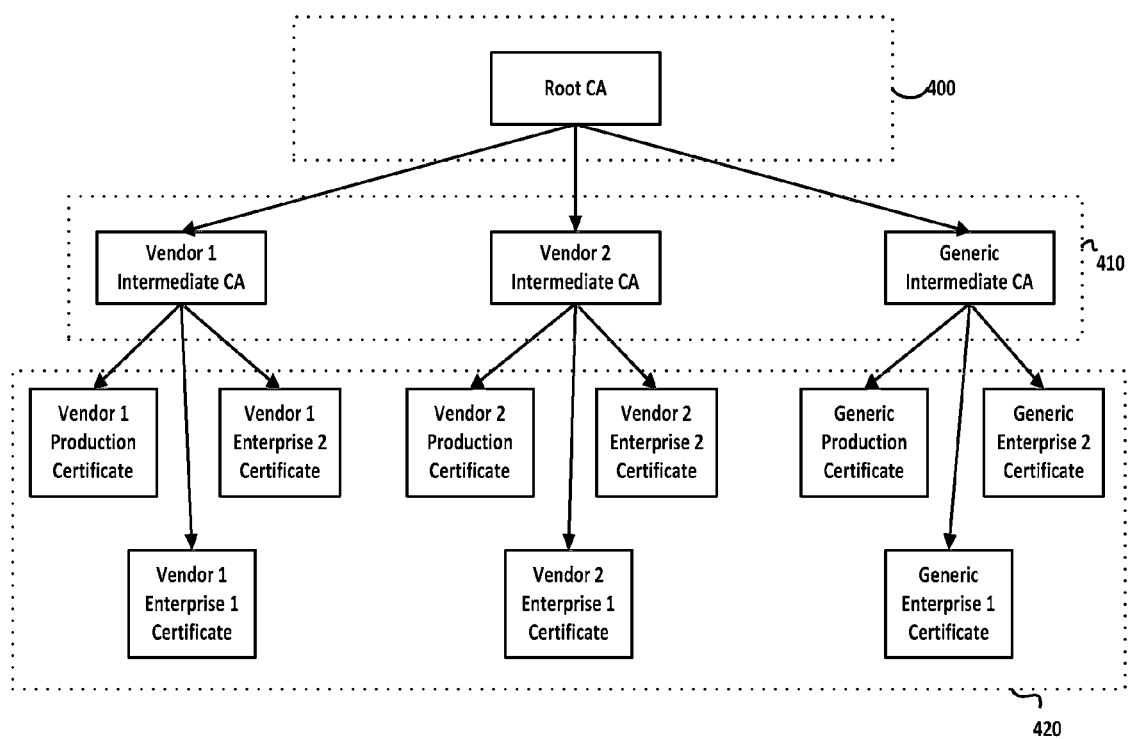
FIG. 4 shows an example of the multi-persona client certificate chain.

The device client will negotiate and maintain unique security associations with each server during registration. FIG. 4 shows a tree structure of the certificates built into the device client. This is an example of multi-persona certificate chain. The client will have a built-in Root CA [400] and intermediate CA [410]. In an embodiment, a client may have a Home Persona CA. In another embodiment, the Home Persona CA may be provided by the home server at enrollment. All intermediate CAs will be signed by the Root CA. All Persona Certificates 420 will be signed with their respective intermediate CA. A multi-persona certificate chain should also contain home certificate for auto enrollment.

Figure 5:
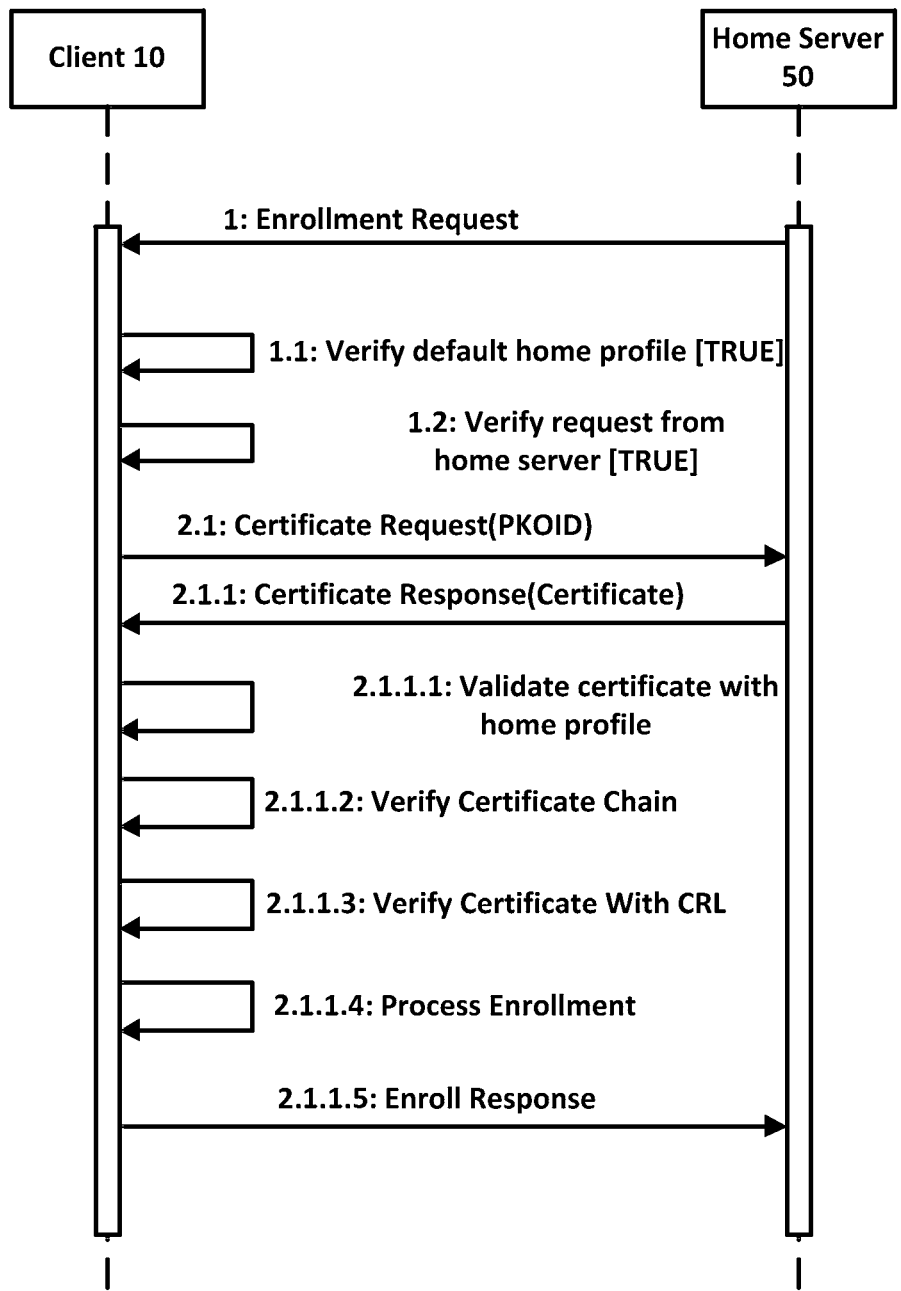
FIG. 5 shows an example flow of a new enrollment with a home server.

FIG. 5 describes an enrollment procedure with a home server. An enrollment request is sent to a device client 10 from a server that needs to be identified as a home server 50 [1]. The client 10 first validates if a home profile is pre-configured on the client [1.1]. If configured, the device client 10 will then validate if the incoming request originated from the home server 50 by matching the server address with the pre-configured home profile address [1.2]. The device client 10 will request a server certificate (vendor certificate) from the home server 50 by transmitting the PKOID of the intermediate CAs [2.1]. The server 50 will publish its own certificates based on the PKOID received from the device [2.1.1]. The client 10 compares the certificate with its pre-configured home certificate [2.1.1.1]. The client 10 then validates the certificate against the certificate chain comprising of the intermediate and Root CA [2.1.1.2]. If it is verified successfully, the client 10 will verify the certificate against the certificate revocation list [2.1.1.3]. Once verified, the client 10 processes the enrollment request [2.1.1.4]. An enrollment response is sent back to the home server 50 [2.1.1.5]. The client is now enrolled with the home server 50.

Figure 6:
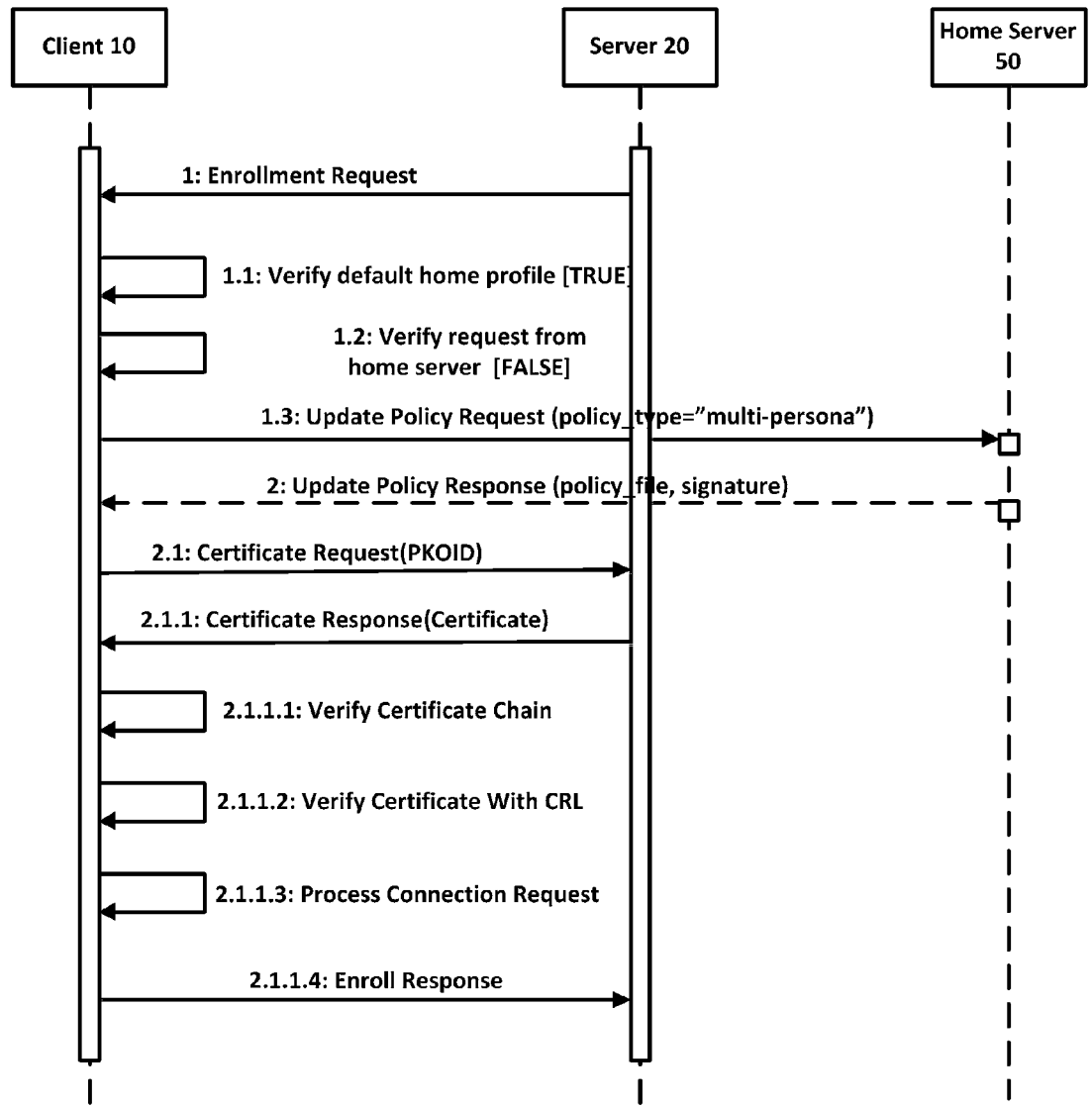
FIG. 6 shows an example flow of a new enrollment with persona server other than a home server.

FIG. 6 shows a flow of a new enrollment process with persona server other than home server. An enrollment request is sent from a server 20 to a device client 10 [1]. The client 10 first validates if a default home profile is pre-configured on the client [1.1]. If configured, the device client 10 will then validate if the incoming request originated from the home server 50 by matching the server address with the pre-configured home profile address [1.2]. If the incoming request did not originate from the home server 50, then the client 10 sends an update policy request to the home server 50 to incorporate any changes made on the multi-persona policy [1.3]. The home server 50 responds back with the updated policy and its signature [2]. Once the policy has been updated, the client 10 sends a certificate request to the server 20 requesting enrollment [2.1]. The server 20 responds back with the appropriate certificates [2.1.1]. The certificates are verified by the device client 10 against the certificate chain built into the client 10 [2.1.1.1]. The certificates are verified against the certificate revocation list, if any [2.1.1.2]. Once the certificates are validated, the client 10 processes the enrollment request [2.1.1.3]. An enrollment response is sent back to the requesting server 20 [2.1.1.4]. The device client 10 is now enrolled with the server 20.

Figure 7:
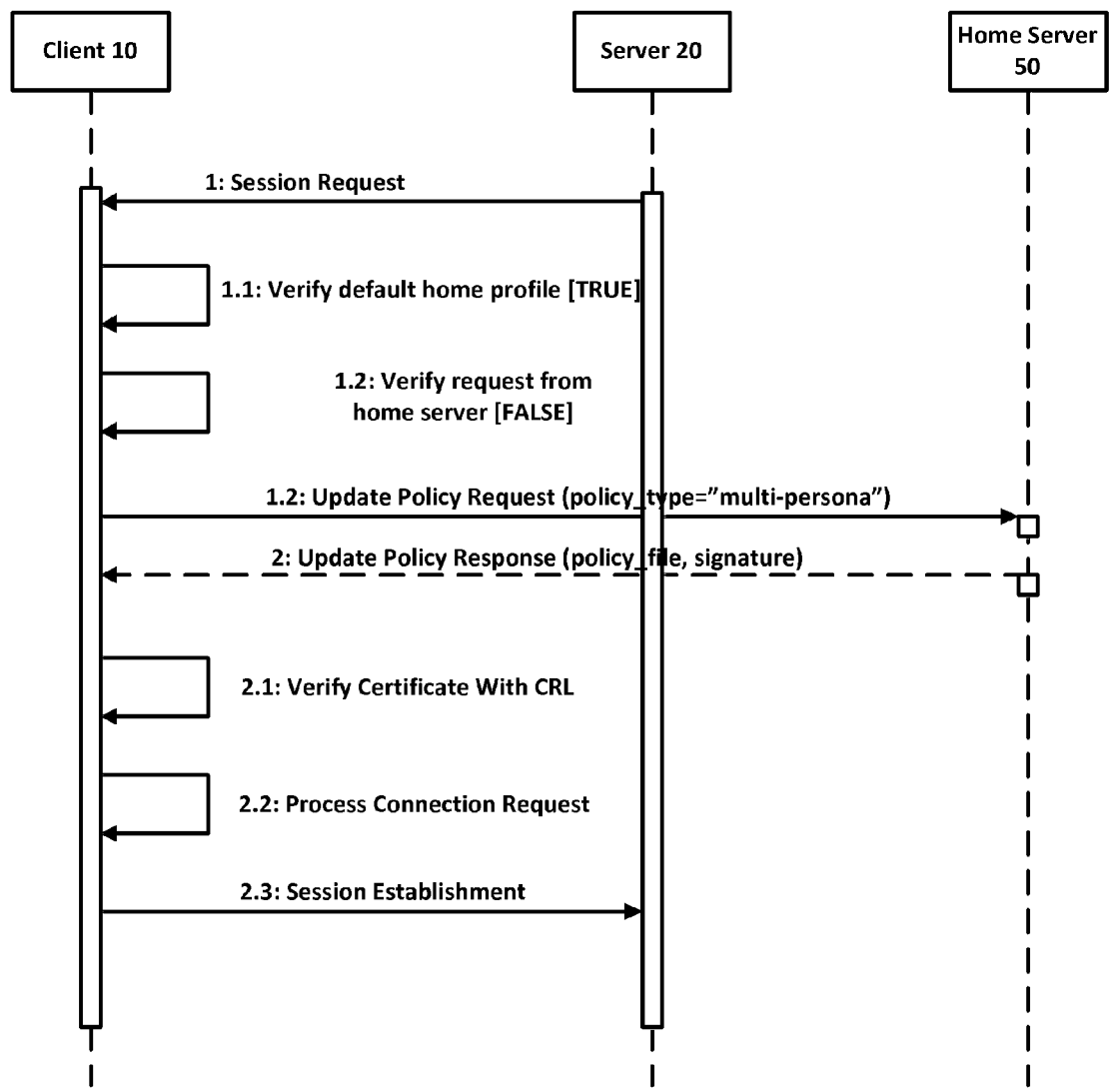
FIG. 7 shows an example flow of a new session with a persona server other than a home server.

FIG. 7 describes a flow of a new session with a persona server other than a home server. A session request is sent from a persona server 20 to a device client 10 [1]. The client 10 first validates if a default home profile is pre-configured on the client [1.1]. If configured, the device client 10 will then validate if the incoming request originated from the home server by matching the server address with the pre-configured home profile address 50 [1.2]. If the incoming request did not originate from the home server, the client 10 sends an update policy request of policy type multi-persona to the home server 50 [1.2]. The home server 50 responds back with the updated policy and its signature [2]. Once the policy has been updated, the client 10 verifies the certificates of the persona server 20 with the certificate revocation list to check if it is still valid [2.1]. Once verified, it processes the incoming connection request [2.2] and establishes a remote session with the persona server 20 [2.3].

Figure 8:
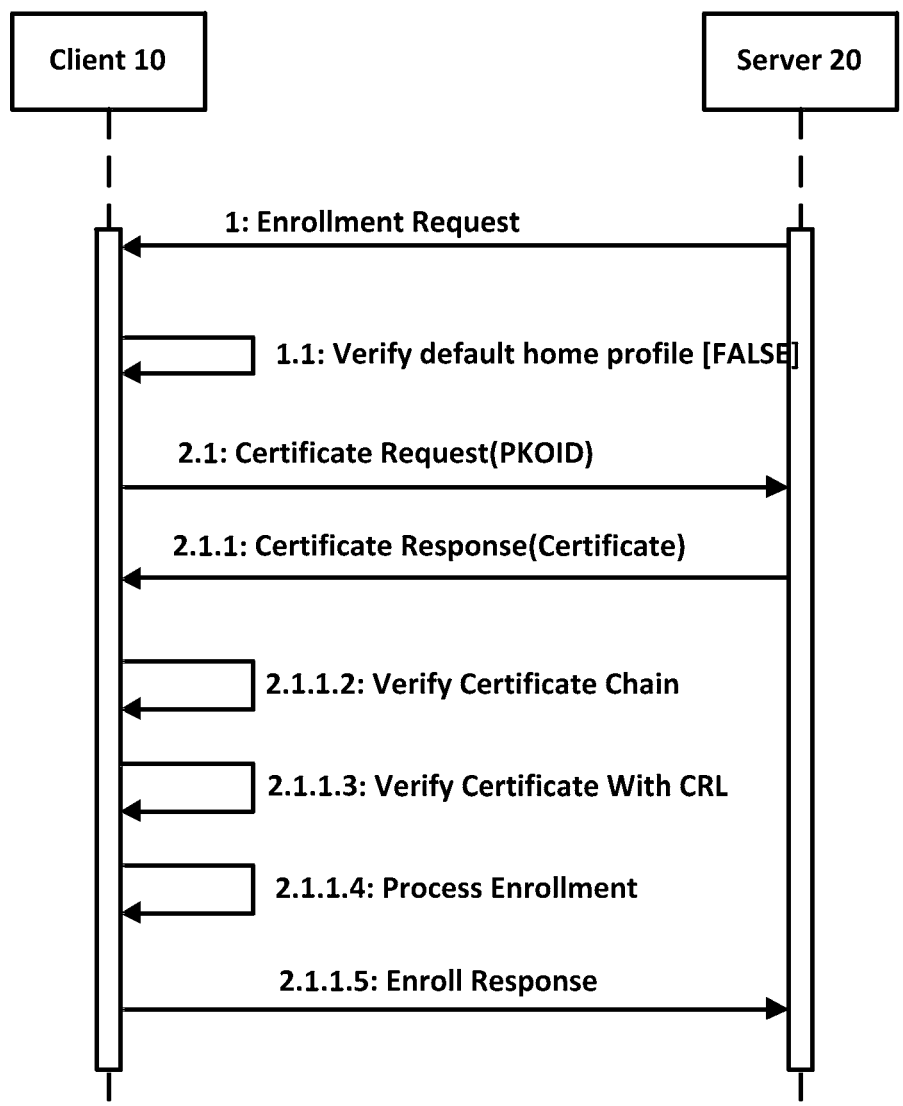
FIG. 8 shows an example flow of a new enrollment when a home server profile does not exist.

FIG. 8 shows a flow of a new enrollment process when a home server profile does not exist. An enrollment request is sent from a server 20 to a device client 10 [1]. The client 10 first validates if a default home profile is pre-configured on the client. [1.1]. If not configured, the device client 10 will request a server certificate from the persona server 20 by transmitting the PKOID of the intermediate CAs [2.1]. The server 20 responds back with the appropriate certificates [2.1.1]. The certificates are verified by the device client 10 against the certificate chain built into the client 10 [2.1.1.1]. The certificates are verified against the certificate revocation list, if any [2.1.1.2]. Once the certificates are validated, the client 10 processes the enrollment request [2.1.1.3]. An enrollment response is sent back to the requesting server 20 [2.1.1.4]. The device client 10 is now enrolled with the server 20.

Figure 9:
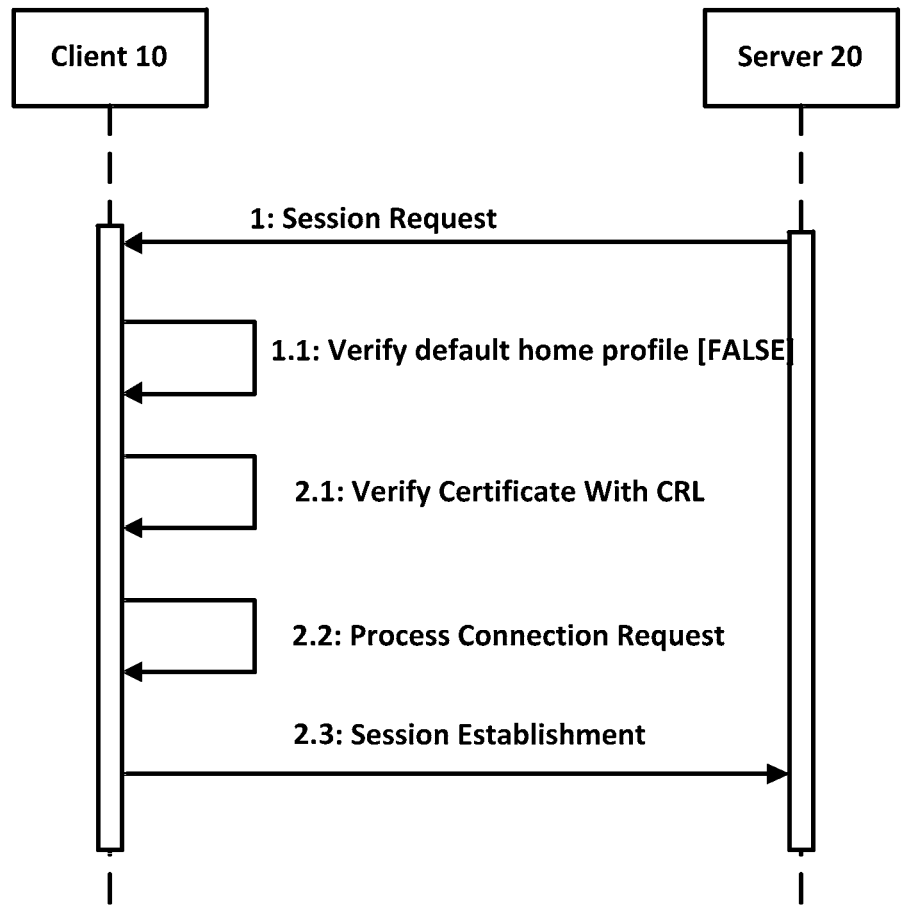
FIG. 9 shows an example flow of a new session when a home server profile does not exist.

FIG. 9 describes a flow of a new session with a persona server when a home server profile does not exist. A session request is sent from a persona server 20 to a device client 10 [1]. The client 10 first validates if a default home profile is pre-configured on the client. [1.1]. If not configured, the client 10 verifies the certificates of the persona server 20 with the certificate revocation list to check if it is still valid [2.1]. Once verified, it processes the incoming connection request [2.2] and establishes a remote session with the persona server 20 [2.3].

In general, an embodiment for a method for remote management is described herein including enabling a multi-persona client on a mobile device, establishing a unique security association with a vendor using a multi-persona certificate chain to verify a vendor certificate, wherein the multi-persona certificate chain includes at least a root certificate and intermediate certificate, and maintaining multiple unique security associations with multiple vendors.

The multi-persona certificate chain may include a home persona certificate. In another embodiment, the method may further include receiving from a home server a policy to enable the multi-persona client on the mobile device. The policy may include at least a multi-persona profile, audit profile, client behavior profile, security policies, bootstrap behavior, access control policy, and service control policy. In an embodiment, the multi-persona client may be preloaded by a vendor for support to be provided by at least the vendor and other vendors. In another embodiment, the multi-persona client is post-loaded by a vendor for support to be provided by at least the vendor and other vendors.

In another embodiment, the method further includes confirming the vendor certificate against a certificate revocation list. The vendor and the multiple vendors may each be identified by a Public Key Organization Identifier (PKOID). An enterprise vendor may be identified by a combination of the PKOID and a Public Key Organization Index (PKOI). The multi-persona client applies pre-negotiated policies and profiles for a given vendor during a remote management session.

In an embodiment, the method includes receiving an enrollment request from at least one vendor, requesting a vendor certificate, wherein a Public Key Organization Identifier (PKOID) of intermediate certificates is sent to the at least one vendor, verifying a published vendor certificate with the multi-persona certificate chain, and saving the published vendor certificate upon successful verification.

In an embodiment, the method includes receiving an enrollment request from a vendor server, confirming that the enrollment request is not from a home server, transmitting an update policy request to the home server to incorporate any changes made on a multi-persona policy, receiving an updated policy and home server signature, requesting a vendor server certificate from the vendor server, verifying the vendor server certificate with the multi-persona certificate chain, and transmitting an enrollment response to the vendor server upon successful verification to complete enrollment and establish the unique security association with the vendor server. In an embodiment, the method includes verifying the vendor server certificate against a certificate revocation list.

In an embodiment, the method includes establishing a remote management session with one vendor from the vendor or multiple vendors, verifying that the one vendor is not a home server, sending an update multi-persona policy request to the home server, receiving an updated policy and a home server signature, verifying certificates from the one vendor with a certificate revocation list, and connecting the remote management session with the vendor upon successful verification.

In an embodiment, the method includes receiving an enrollment request from a home server, matching a server address of the enrollment request with a pre-configured home profile address on a condition that a home profile is pre-configured on the mobile device, transmitting a server certificate request with a Public Key Organization Identifier (PKOID) of intermediate certificates, verifying server certificate with a pre-configured home certificate, verifying the server certificate with the multi-persona certificate chain, verifying the server certificate against a certificate revocation list, and transmitting an enrollment response to the home server upon successful verification to complete home server enrollment.

In an embodiment, the method includes receiving an enrollment request from a vendor server, transmitting a vendor server certificate request with a Public Key Organization Identifier (PKOID) of intermediate certificates on a condition that home profile configuration is absent, verifying a vendor server certificate with the multi-persona certificate chain, verifying the vendor server certificate against a certificate revocation list, and transmitting an enrollment response to the vendor server upon successful verification to complete enrollment and establish the unique security association with the vendor server.

In an embodiment, a mobile device includes a multi-persona client, a multi-persona certificate chain, wherein the multi-persona certificate chain includes at least a root certificate and intermediate certificate, and unique security associations with multiple vendors established and maintained using the multi-persona certificate chain to verify the multiple vendor certificates. The multi-persona certificate chain may include a home persona certificate.

In an embodiment, the mobile device further includes a policy to enable the multi-persona client on the mobile device. The policy includes at least a multi-persona profile, audit profile, client behavior profile, security policies, bootstrap behavior, access control policy, and service control policy.

In an embodiment, the multi-persona client is preloaded by a vendor for support to be provided by at least the vendor and other vendors. In an embodiment, the multi-persona client is post-loaded by a vendor for support to be provided by at least the vendor and other vendors.

In an embodiment, the unique security associations are confirmed using a certificate revocation list. In an embodiment, the multiple vendors are identified by a Public Key Organization Identifier (PKOID) and the enterprise vendors are identified by a combination of the PKOID and a Public Key Organization Index (PKOI).

In an embodiment, the multi-persona client applies pre-negotiated policies and profiles for a given vendor during a remote management session.

In an embodiment, the mobile device is configured to receive an enrollment request from at least one vendor, the mobile device is configured to request a vendor certificate, wherein a Public Key Organization Identifier (PKOID) of intermediate certificates is sent to the at least one vendor, the multi-persona client is configured to verify a published vendor certificate with the multi-persona certificate chain, and the multi-persona client is configured to save the published vendor certificate upon successful verification.

In an embodiment, the mobile device is configured to receive an enrollment request from a vendor server, the multi-persona client is configured to confirm that the enrollment request is not from a home server, the multi-persona client is configured to send an update policy request to the home server to incorporate any changes made on a multi-persona policy, the multi-persona client is configured to process an updated policy and home server signature, the multi-persona client is configured to request a vendor server certificate from the vendor server, the multi-persona client is configured to verify vendor server certificates with the multi-persona certificate chain, and the multi-persona client is configured to send an enrollment response to the vendor server upon successful verification to complete enrollment and establish the unique security association with the vendor server.

In an embodiment, the mobile device is configured to establish a remote management session with one vendor from the vendor or multiple vendors, the multi-persona client is configured to verify that the one vendor is not a home server, the multi-persona client is configured to send an update multi-persona policy request to the home server, the multi-persona client is configured to receive an updated policy and a home server signature, the multi-persona client is configured to verify certificates from the one vendor with a certificate revocation list, and the mobile device is configured to connect the remote management session with the vendor upon successful verification.

In an embodiment, the mobile device is configured to receive an enrollment request from a home server, the multi-persona client is configured to match a server address of the enrollment request with a pre-configured home profile address on a condition that a home profile is pre-configured on the mobile device, the mobile device is configured to transmit a server certificate request with a Public Key Organization Identifier (PKOID) of intermediate certificates, the multi-persona client is configured to verify server certificate with a pre-configured home certificate, the multi-persona client is configured to verify the server certificate with the multi-persona certificate chain, the multi-persona client is configured to verify the server certificate against a certificate revocation list, and the mobile device is configured to transmit an enrollment response to the home server upon successful verification to complete home server enrollment.

In an embodiment, the mobile device is configured to receive an enrollment request from a vendor server, the mobile device is configured to transmit a vendor server certificate request with a Public Key Organization Identifier (PKOID) of intermediate certificates on a condition that a home profile is absent, the multi-persona client is configured to verify a vendor server certificate with the multi-persona certificate chain, the multi-persona client is configured to verify the vendor server certificate against a certificate revocation list, and the mobile device is configured to transmit an enrollment response to the vendor server upon successful verification to complete enrollment and establish the unique security association with the vendor server. The mobile device further includes at least one default home profile.

While detailed embodiments of the instant invention are disclosed herein, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the technology to variously employ the present invention in virtually any appropriately detailed structure.

Although features and elements are described above in particular combinations, each feature or element can be used alone without the other features and elements or in various combinations with or without other features and elements.

What is claimed is:
1. A method for remote management, the method comprising:
   enabling a multi-persona client on a mobile device;
   receiving an enrollment request from a vendor server;
   confirming that the enrollment request is not from a home server;
   transmitting an update policy request to the home server to incorporate any changes made on a multi-persona policy;
   receiving an updated policy and home server signature;

requesting a vendor server certificate from the vendor server;
verifying the vendor server certificate with a multi-persona certificate chain, wherein the multi-persona certificate chain includes at least a root certificate and intermediate certificate;
transmitting an enrollment response to the vendor server upon successful verification to complete enrollment;
establishing a unique security association with the vendor server; and
maintaining multiple unique security associations with multiple vendors.

2. The method of claim 1, wherein the multi-persona certificate chain includes a home persona certificate.

3. The method of claim 1, further comprising:
receiving from the home server a policy to enable the multi-persona client on the mobile device.

4. The method of claim 3, wherein the policy includes at least a multi-persona profile, audit profile, client behavior profile, security policies, bootstrap behavior, access control policy, and service control policy.

5. The method of claim 1, wherein the multi-persona client is preloaded by a vendor for support to be provided by at least the vendor and other vendors.

6. The method of claim 1, wherein the multi-persona client is post-loaded by a vendor for support to be provided by at least the vendor and other vendors.

7. The method of claim 1, further comprising:
confirming the vendor certificate against a certificate revocation list.

8. The method of claim 7, wherein the multi-persona client applies pre-negotiated policies and profiles for a given vendor during a remote management session.

9. The method of claim 1, wherein the multiple vendors will each be identified by a Public Key Organization Identifier (PKOID).

10. The method of claim 9, wherein enterprise vendors will be identified by a combination of the PKOID and a Public Key Organization Index (PKOI).

11. The method of claim 1,
wherein a Public Key Organization Identifier (PKOID) of intermediate certificates is sent to the vendor server, and further comprising:
verifying a published vendor certificate with the multi-persona certificate chain; and
saving the published vendor certificate upon successful verification.

12. The method of claim 1, further comprising:
verifying the vendor server certificate against a certificate revocation list.

13. The method of claim 1, further comprising:
establishing a remote management session with one vendor from the vendor server or multiple vendors;
verifying that the one vendor is not the home server;
sending an update multi-persona policy request to the home server;
receiving an updated policy and a home server signature;
verifying certificates from the one vendor with a certificate revocation list; and
connecting the remote management session with the one vendor upon successful verification.

14. The method of claim 1, further comprising:
receiving an enrollment request from a home server;
matching a server address of the enrollment request with a pre-configured home profile address on a condition that a home profile is pre-configured on the mobile device;
transmitting a server certificate request with a Public Key Organization Identifier (PKOID) of intermediate certificates;
verifying server certificate with a pre-configured home certificate;
verifying the server certificate with the multi-persona certificate chain;
verifying the server certificate against a certificate revocation list; and
transmitting an enrollment response to the home server upon successful verification to complete home server enrollment.

15. The method of claim 1, further comprising:
transmitting a vendor server certificate request with a Public Key Organization Identifier (PKOID) of intermediate certificates on a condition that home profile configuration is absent; and
verifying the vendor server certificate against a certificate revocation list.

16. A mobile device, comprising:
a multi-persona client;
a multi-persona certificate chain, wherein the multi-persona certificate chain includes at least a root certificate and intermediate certificate; and
unique security associations with multiple vendors established and maintained using the multi-persona certificate chain to verify the multiple vendor certificates, wherein:
the mobile device is configured to establish a remote management session with a vendor server from the multiple vendors;
the multi-persona client is configured to verify that the vendor server is not a home server;
the multi-persona client is configured to send an update multi-persona policy request to the home server;
the multi-persona client is configured to receive an updated policy and a home server signature;
the multi-persona client is configured to verify certificates from the vendor server with a certificate revocation list; and
the mobile device is configured to connect the remote management session with the vendor server upon successful verification.

17. The mobile device of claim 16, wherein the multi-persona certificate chain includes a home persona certificate.

18. The mobile device of claim 16, further comprising:
a policy to enable the multi-persona client on the mobile device.

19. The mobile device of claim 16, wherein the policy includes at least a multi-persona profile, audit profile, client behavior profile, security policies, bootstrap behavior, access control policy, and service control policy.

20. The mobile device of claim 16, wherein the multi-persona client is preloaded by a vendor for support to be provided by at least the vendor and other vendors.

21. The mobile device of claim 16, wherein the multi-persona client is post-loaded by a vendor for support to be provided by at least the vendor and other vendors.

22. The mobile device of claim 16, wherein the multiple vendors are identified by a Public Key Organization Identifier (PKOID).

23. The mobile device of claim 22, wherein enterprise vendors are identified by a combination of the PKOID and a Public Key Organization Index (PKOI).

24. The mobile device of claim 16, wherein the multi-persona client applies pre-negotiated policies and profiles for a given vendor during a remote management session.

25. The mobile device of claim 16, wherein:
the mobile device is configured to receive an enrollment request from the vendor server;
the mobile device is configured to request a vendor certificate, wherein a Public Key Organization Identifier (PKOID) of intermediate certificates is sent to the vendor server:
the multi-persona client is configured to verify a published vendor certificate with the multi-persona certificate chain; and
the multi-persona client is configured to save the published vendor certificate upon successful verification.

26. The mobile device of claim 16, wherein:
the mobile device is configured to receive an enrollment request from the vendor server;
the multi-persona client is configured to confirm that the enrollment request is not from a home server;
the multi-persona client is configured to process an updated policy and home server signature;
the multi-persona client is configured to request a vendor server certificate from the vendor server;
the multi-persona client is configured to verify vendor server certificates with the multi-persona certificate chain; and
the multi-persona client is configured to send an enrollment response to the vendor server upon successful verification to complete enrollment and establish the unique security association with the vendor server.

27. The mobile device of claim 16, further comprising:
the mobile device is configured to receive an enrollment request from a home server;
the multi-persona client is configured to match a server address of the enrollment request with a pre-configured home profile address on a condition that a home profile is pre-configured on the mobile device;
the mobile device is configured to transmit a server certificate request with a Public Key Organization Identifier (PKOID) of intermediate certificates;
the multi-persona client is configured to verify server certificate with a pre-configured home certificate;
the multi-persona client is configured to verify the server certificate with the multi-persona certificate chain;
the multi-persona client is configured to verify the server certificate against a certificate revocation list; and
the mobile device is configured to transmit an enrollment response to the home server upon successful verification to complete home server enrollment.

28. The mobile device of claim 16, further comprising:
the mobile device is configured to receive an enrollment request from the vendor server;
the mobile device is configured to transmit a vendor server certificate request with a Public Key Organization Identifier (PKOID) of intermediate certificates on a condition that a home profile is absent;
the multi-persona client is configured to verify a vendor server certificate with the multi-persona certificate chain; and
the mobile device is configured to transmit an enrollment response to the vendor server upon successful verification to complete enrollment and establish the unique security association with the vendor server.

29. The mobile device of claim 16, further comprising:
at least one default home profile.

30. A method for remote management, the method comprising:
enabling a multi-persona client on a mobile device;
receiving an enrollment request from a home server;
matching a server address of the enrollment request with a pre-configured home profile address on a condition that a home profile is pre-configured on the mobile device;
transmitting a server certificate request with a Public Key Organization Identifier (PKOID) of intermediate certificates;
verifying server certificate with a pre-configured home certificate;
verifying the server certificate with a multi-persona certificate chain, herein the multi-persona certificate chain includes at least a root certificate and intermediate certificate;
verifying the server certificate against a certificate revocation list;
transmitting an enrollment response to the home server upon successful verification to complete home server enrollment;
establishing a unique security association with a vendor server using the multi-persona certificate chain to verify a vendor certificate; and
maintaining multiple unique security associations with multiple vendor servers.

31. A mobile device, comprising:
a multi-persona client;
a multi-persona certificate chain, wherein the multi-persona certificate chain includes at least a root certificate and intermediate certificate; and
unique security associations with multiple vendor servers established and maintained using the multi-persona certificate chain to verify the multiple vendor certificates, wherein:
the mobile device is configured to receive an enrollment request from a vendor server;
the multi-persona client is configured to confirm that the enrollment request is not from a home server;
the multi-persona client is configured to send an update policy request to the home server to incorporate any changes made on a multi-persona policy;
the multi-persona client is configured to process an updated policy and home server signature;
the multi-persona client is configured to request a vendor server certificate from the vendor server;
the multi-persona client is configured to verify vendor server certificates with the multi-persona certificate chain; and
the multi-persona client is configured to send an enrollment response to the vendor server upon successful verification to complete enrollment and establish the unique security association with the vendor server.

* * * * *